Nov. 26, 1929.  P. W. LEHMAN  1,737,116
TIRE BUILDING MACHINE
Filed July 21, 1927
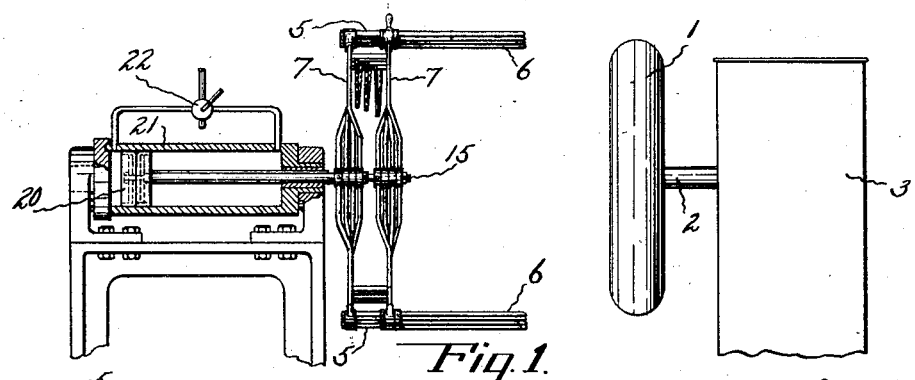
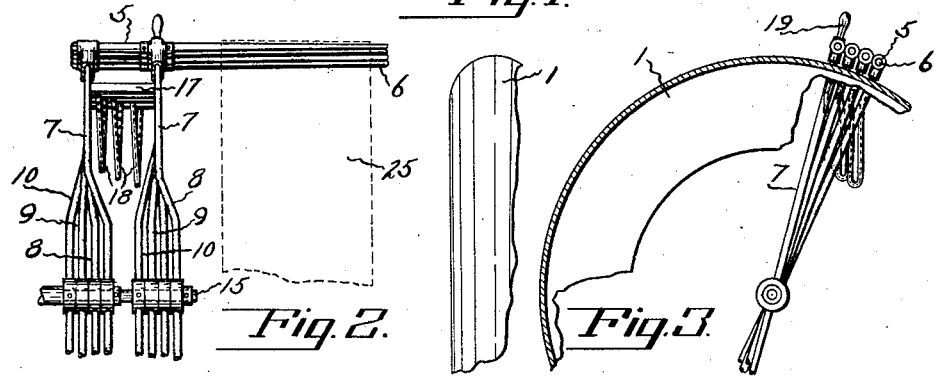
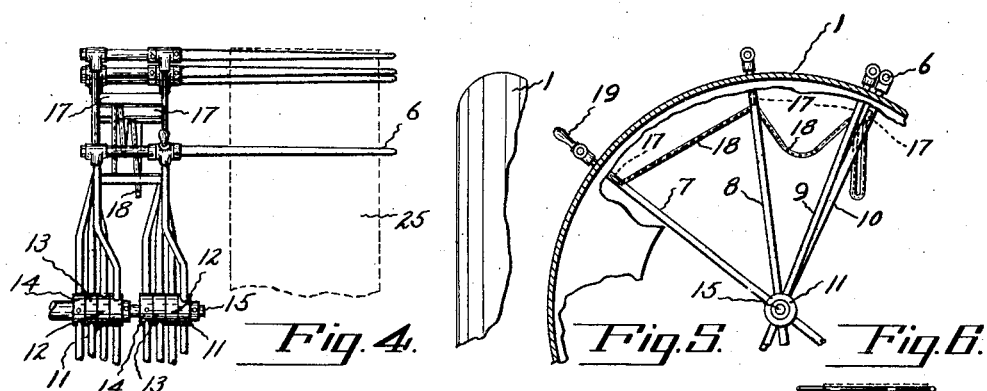
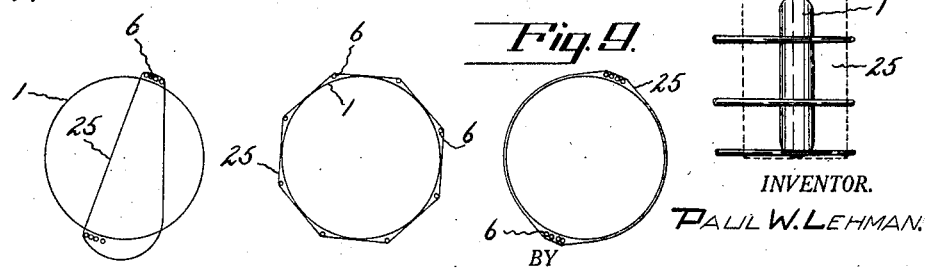
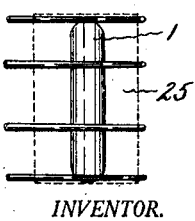
INVENTOR.
PAUL W. LEHMAN.
BY
ATTORNEY.

Patented Nov. 26, 1929

1,737,116

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed July 21, 1927. Serial No. 207,547.

This invention relates to tire building machines and more particularly to a device for stretching bands of tire material and positioning such bands on the tire building core. It is among the objects of my invention to provide a machine simple in construction which will substantially uniformly stretch a band of carcass material to approximately the crown diameter of the core and position the so-stretched bands in proper relation upon the core. Other and further objects will be apparent from the following specification and claims.

In the accompanying drawings which illustrate one embodiment of my invention,

Fig. 1 is a front elevation partly in section;

Fig. 2 shows parts of Fig. 1 on an enlarged scale, the stretching fingers being in collapsed position;

Fig. 3 is a side elevation of the structure shown in Fig. 2;

Fig. 4 is a view similar to Fig. 2 but showing the fingers at the start of the stretching operation;

Fig. 5 is a side elevation of the structure shown in Fig. 4;

Fig. 6 is a detail view showing the manner of positioning the bands upon the core; and Figs. 7, 8, and 9 are diagrammatic views illustrating the operation of the device.

Referring to the drawings, 1 designates a suitable building core mounted on shaft 2 and adapted to be rotated by a suitable power plant in housing 3. The positioning and stretching mechanism comprises a plurality of fingers 5 provided with anti-friction rolls 6. These fingers are secured to the ends of pairs of radially extending arms 7, 8, 9, and 10 secured respectively to hubs 11, 12, 13, and 14. In the form illustrated these hubs are all free to rotate on shaft 15, aligned with shaft 2, except hub 14 to which arms 10 are secured. Each pair of supporting arms is connected by a brace 17 and the braces are connected by chains 18 or other flexible means of a predetermined length such that, when arms 7, 8, 9, and 10 are fanned out around shaft 15, fingers 6 will be substantially equally spaced about the perimeter of the building core. One of the arms, such as 7, is provided with a handle 19 to facilitate the stretching operation. One end of shaft 15 is provided with a head 20 working in air cylinder 21, the latter being operated from a two-way valve 22 in a well known manner, to move the fingers as a unit transversely. The operation of the device is as follows:

With the fingers in the position shown in Figs. 1 and 7, a band of carcass material 25 is hung thereon as shown in the latter figure. By means of handle 19 the fingers are then spread or fanned into the position shown in Fig. 8, thereby stretching the band of carcass material to substantially the crown diameter of the core. Air cylinder 21 is then operated to move the fingers bodily over the core as shown in Fig. 6. Handle 19 is then operated in a reverse direction to restore the fingers to their original position as shown in Fig. 9, thereby releasing a substantial part of the band onto the core. Air cylinder 21 is then reversed to withdraw the fingers 6 leaving the band 25 in the desired position on the core.

Having thus described my invention, I claim:

1. A device of the character described comprising a plurality of supports mounted for pivotal movement about a common center, band receiving fingers projecting from the ends of said supports and having free outer ends and means to swing the supports about the common center to alternately position the fingers in radially opposite groups and in substantially equally spaced circular relation.

2. A device of the character described comprising a fixed support, a plurality of movable supports mounted for pivotal movement about a common center, band receiving fingers projecting from the ends of the fixed and movable supports and having free outer ends, and means to swing the movable supports about the common center to alternately position the fingers in radially opposite groups adjacent the fixed support and in substantially equally spaced circular relation.

3. A device of the character described comprising a plurality of supports mounted for pivotal movement about a common center, band receiving fingers projecting from the ends of said supports and having free outer ends, means to swing the supports about the common center to alternately position the fingers in radially opposite groups and in substantially equally spaced circular relation and means to move the supports bodily to telescope the fingers over the core of a tire building machine.

4. A device of the character described comprising a fixed support, a plurality of movable supports mounted for pivotal movement about a common center, band receiving fingers projecting from the ends of the fixed and movable supports and having free outer ends, means to swing the movable supports about the common center to alternately position the fingers in radially opposite groups adjacent the fixed support and in substantially equally spaced circular relation, and means to move the fixed and movable supports bodily to telescope the fingers over the core of a tire building machine.

5. A device of the character described comprising a fixed support, a plurality of movable supports mounted for pivotal movement about a common center, band receiving fingers projecting from the ends of the fixed and movable supports and flexible connections between the supports.

PAUL W. LEHMAN.